ELECTRICAL APPARATUS

Filed June 24, 1957

2 Sheets-Sheet 1

INVENTOR.
LOUIS G. OLIARI
BY Henry L. Hanson
ATTORNEY

Dec. 29, 1959 L. G. OLIARI 2,919,433

ELECTRICAL APPARATUS

Filed June 24, 1957 2 Sheets-Sheet 2

INVENTOR.
LOUIS G. OLIARI
BY Henry L. Hanson
ATTORNEY

United States Patent Office 2,919,433

Patented Dec. 29, 1959

2,919,433

ELECTRICAL APPARATUS

Louis G. Oliari, Brockton, Mass., assignor, by mesne assignments, to Minneapolis-Honeywell Regulator Company, a corporation of Delaware Application June 24, 1957, Serial No. 667,530

12 Claims. (Cl. 340—174)

A general object of the present invention is to provide a new and improved digital data manipulating circuit incorporating magnetic core devices as the active elements of the circuit. More specifically, the present invention is concerned with a new and improved magnetic core circuit arranged to function as a binary flip-flop wherein said circuit is characterized by its simplicity, its flexibility, and its ability to function with magnetic cores having a relatively wide range of operating characteristics.

In an article by S. Guterman, et al. entitled "Logical and Control Functions Performed with Magnetic Cores," Proceedings of the I.R.E., March 1955, there are described a number of magnetic core circuits using core devices having relatively large residual magnetic flux characteristics. The present invention is concerned with an improvement in the circuitry disclosed in the Guterman article. Theoretically, the number of control windings that may be placed on any magnetic core of the bistable type to control the switching of the core between its two stable states is limited by the physical limitations of core size and the size of the wire of the windings. In practice, however, the number of windings is limited by the fact that the hysteresis characteristics of the core elements are not consistent and uniform so that beyond a certain point it is difficult to produce a working circuit except on a laboratory basis. Consequently, in order to increase the yield of cores from any batch, the circuitry must be capable of operating with cores having divergent characteristics. The core winding combination found to be most effective in realizing the objectives of the present invention has been one where the windings on any one core have been limited to an input assert winding, an input inhibit winding, an output winding, and a shift winding. By so limiting the windings on the cores, it is possible to utilize core elements having a fairly wide range of hysteresis characteristics without impairing the over-all operation of the circuit. While the circuit will function with additional windings it is essential that there be a much closer match of the core characteristic and the windings. The matching of these elements and their windings becomes extremely burdensome on a production basis. Consequently, the present invention has been devised to utilize magnetic cores having a wide range of operating characteristics with a minimum of control windings and other circuitry in order to effect the desired binary operation.

It is accordingly a further more specific object of the present invention to provide a binary flip-flop utilizing a pair of magnetic core devices wherein a minimum number of circuit components and windings are necessary in order to effect the desired circuit operation.

The features of the present invention are achieved by a pair of magnetic core devices having their windings so connected that one of the circuits functions, when set, to dynamically store a signal and when so storing a signal will be indicating one of the bistable states of the flip-flop. The circulating path for the dynamic storage function comprises a signal delay circuit which is common to the circuit which is used to set the flip-flop into the state in which it is dynamically storing a signal. This sharing of the circuitry considerably simplifies the circuit, minimizes the number of windings needed on the cores, and minimizes the number of electrical components required for connecting the circuits.

Another more specific object of the invention is therefore to provide a binary flip-flop utilizing magnetic core devices with a single signal delay circuit shared by the two magnetic cores which form the active elements of the flip-flop.

Another feature of the present invention lies in its ability to function with input signals occurring at the same rate that the shift signals are applied to the magnetic cores of the circuit. This feature has been achieved without the necessity of adding additional input windings on the circuit and by further sharing the electrical circuitry which interconnects the cores of the circuit.

Still another object is therefore to provide a new and improved binary flip-flop which incorporates a pair of magnetic core devices having their output connected through a common signal transfer circuit and with the windings of the respective cores so connected that successive input signals applied to the circuit may occur at the same rate as shift signals are applied to the cores of the circuit.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
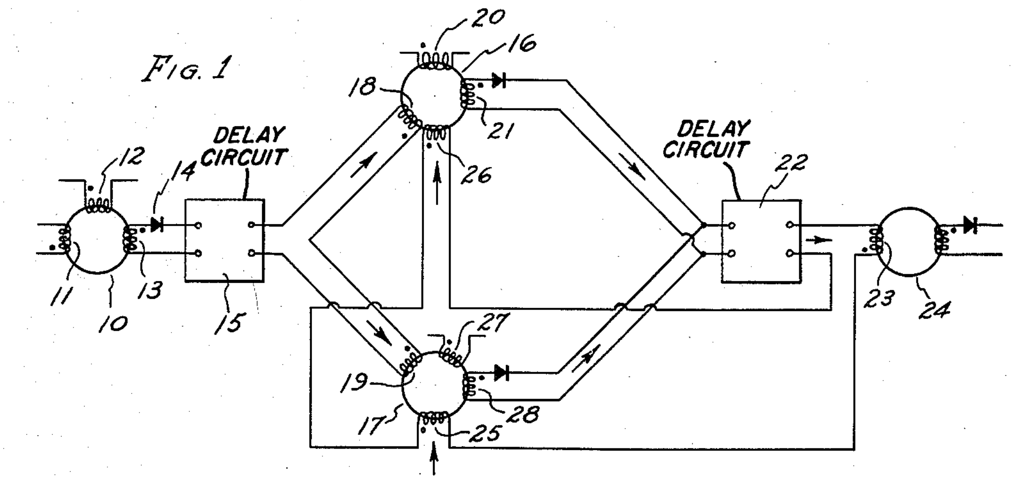
Figure 1 illustrates the basic circuitry for a binary flip-flop incorporating the principles of the present invention.

Referring first to Figure 1, the numeral 10 represents an input magnetic core having substantial bistable residual flux characteristics. The core 10 has an input winding 11 connected to a suitable signal source which is adapted, when energized, to set the core 10 in a predetermined state. It is assumed that the winding 11 is an assert winding so that when a shift signal is applied to the core 10 by way of a shift winding 12 the core 10 will be switched back to its reset state and in so doing will induce a signal in the output winding 13.

The signal in the output winding 13 will be passed through a decoupling diode 14 to a signal delay network 15 formed by suitable delay elements, such as resistors, condensers, and inductors in the manner well known in the art. The output of the delay circuit 15 is applied to two core devices 16 and 17. The input to the core 16 is by way of an assert input winding 18 while the input to the core 17 is by way of an inhibit winding 19.

If an assert signal has been applied to the core 16, a shift signal applied to the shift winding 20 will read the signal out into an output winding 21. The signal in the output winding 21 is then coupled into a further signal delay network 22. The output of the delay network 22 is coupled to an assert winding 23 on an output core 24. It is also coupled to an assert winding 25 on the core 17 and to an inhibit winding 26 on the core 16.

A set signal in the core 17 may be shifted out by the application of a shift signal to the shift winding 27 and the resultant output signal will appear on an output winding 28. The signal in the winding 28 is buffered into the input of the signal delay network 22 and is adapted to set the core 24 by way of the winding 23, as well as to circulate back into the core 17 by way of the assert winding 25. The output is also adapted to apply an inhibit signal to the winding 26 on the core 16.

Figure 2:
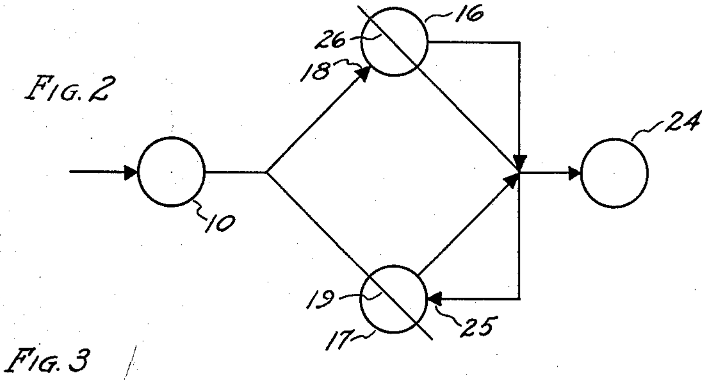
Figure 2 illustrates the manner in which the circuit of Figure 1 appears in logical form.

The logical form for this circuit is illustrated in Figure 2. Here the core 10 is shown as the input core and has its output connected to an assert winding 18 on the core 16, the assert winding being indicated by the arrow on the edge of the core 16. The core 16, in addition, has an inhibit winding 26 illustrated by the line crossing the core. The output of the core 10 also connects to the inhibit winding 19 on the core 17, the inhibit winding again being shown by the line crossing the core 17. The output of the cores 16 and 17 are buffered together to the input of the core 24. Further the outputs of the cores 16 and 17 are arranged to recirculate to the input winding 25 on the core 17 and to the inhibit winding 26 on the core 16.

In considering the operation of the circuit of Figures 1 and 2, it should be considered that it is desired to switch the binary flip-flop from one stable state to the other by the application of successive input signals to the circuit. The bistable states in this circuit may be defined with the set state being the state when a signal is stored in the core 17 so that upon signal shift out, the signal will be read back into the core again upon the occurrence of each successive shift signal to the shift winding thereon. The reset state circuit is defined as that state when there is no signal available for recirculating by way of the core 17.

If the circuit is reset, the application of the first shift signal from the core 10 will result in a signal being read into the core 16. The next shift signal will read the signal from the core 16 into the output core 24 and also into the core 17. The signal is also fed back as an inhibit signal on the winding 26 to prevent the further read-in of a signal into the core 16.

The reading in of a signal into the core 17 will be effective to store a signal therein so that upon the next shift signal, in the absence of a subsequent input from the core 10, will produce an output signal which is read out into the core 24 and recirculated back in by way of the winding 25 to place the core 17 in its active state. Shift signals applied to the core 17 will continue to maintain this signal circulating in the circuit.

When the next input pulse is received from the core 10 it will apply an inhibit signal to the core 17 which will serve to prevent the recirculation of the signal back into the core by way of the winding 25. Further, since a signal was shifted from the core 17 at the time the signal from the core 10 was produced, an inhibit signal will be present on the core 16 so that no signal can be written into the core 16. Consequently, upon the application of the next shift pulse, there will be no signal read out into the core 24 and the circuit may be considered to be in its reset state. The circuit will remain in its reset state until such time as a further input signal is received from the core 10 at which time the circuit will be set as described above.

Figure 3:
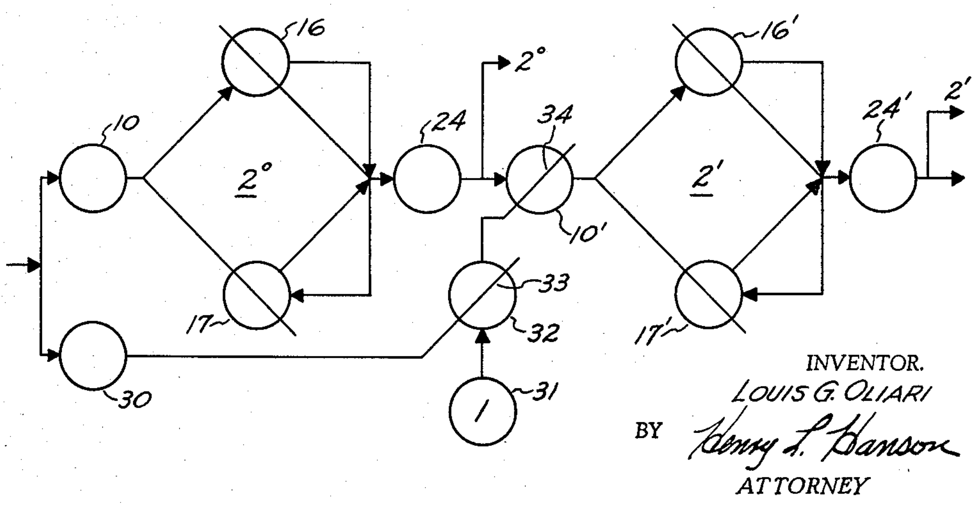
Figure 3 illustrates the manner in which the present binary flip-flop may be used in a two stage binary counter.

The circuit of Figure 3 illustrates one manner in which the binary flip-flop of Figure 2 may be applied to a binary counter. Here, corresponding components carry corresponding reference characters. Thus the first stage which is the $2^0$ stage is formed by the cores 16 and 17. The second stage which is formed in the manner corresponding to the first stage is comprised of active cores $16^1$ and $17^1$. The input and output cores are designated by the numbers $10^1$ and $24^1$, respectively.

Functioning to sense the presence of a carry between stages is a core circuit comprised of the cores 30, 31, and 32. The core 30 is adapted to receive the input signal and apply it to an inhibit winding 33 on the core 32. Connected to an assert winding on the core 32 is the core 31. The core 31 is connected to function as a ones generator and such a ones generator may be defined as a circuit which will produce an output pulse each time that a shift signal is applied to the core. This is achieved electrically by applying bias signals to the core in a direction to set the core so that as a shift pulse is applied, it will switch the core and the resultant switching will produce an output signal each time that a pulse is applied. Such a ones generator is described in the above mentioned article by S. Guterman, et al.

When there is no signal on the inhibit winding 33 of the core 32 the ones generator will be applying signals to assert the core 32 and the shifting of the core 32 will result in signals being applied to the inhibit winding 34 on the core $10^1$. This serves to prevent the data stored in the first stage from being written into the second stage until such time as it is desired that a carry be propagated from one stage to the next.

In considering the operation of the circuit of Figure 3 it is first assumed that the circuit is in the reset state. The resetting of the circuit in the present arrangement may be achieved by applying a shift signal to all of the cores and maintaining that shift signal for a length of time which is in excess of the propagation time of a signal through the delay lines of the circuit. When reset, none of the cores will have a signal stored therein with the exception of the ones generator core 31.

When the first input signal is applied, it is read into the core 10 and into the core 30. On the next shift the signal is read from the core 10 into the core 16 and is also read from the core 30 to the inhibit winding 33. On the next or third shift signal, the signal from the core 16 is shifted out and read into the core 24 as well as into the core 17 so that now the first stage has been set. When the inhibit signal is on the winding 33, the ones generator 31 is not capable of asserting the core 32. Thus on the next shift signal no inhibit signal will be applied to the core 34. Inasmuch as there was no signal in the core 24, the timing of the shifts will be such that even though no signal is on the inhibit winding 34, nothing will be written into the core $10^1$. However after the initial opening of the gate core $10^1$ the gate will remain closed due to the action of the ones generator on the inhibit winding 34 by way of the core 32.

As described thus far, the $2^0$ stage formed by the core 10 and 17 has been assumed to be in the set state due to the application of a single input pulse. The next input pulse fed into the circuit will be effective to reset the $2^0$ stage and the $2^1$ stage will be set. The setting of the $2^1$ stage will be effected by a read out from the core 24 passing through the core $10^1$. The passage through the core $10^1$ will be accomplished when the second input pulse is propagated down through the core circuits 30 and 32 so that no inhibit signal will be applied to the inhibit winding 34 and the core $10^1$ may function as a gate to accept the carry signal from the $2^0$ stage.

When the $2^1$ stage has been set, the $2^0$ stage reset, the third input signal will be effective to place the $2^0$ stage back into the set state. A further input signal will be effective to switch both the $2^0$ and $2^1$ stages back to the reset state. Thus the counter illustrated in Figure 3 may be defined as a modulo 4 counter.

It will be apparent that the principles set forth in the modulo 4 counter may be extended to counters operating with a larger number of stages. It will further be apparent that the successive application of input signals at the rate to which the shift signals are applied will not impair the functioning of the circuit to produce the desired modulo 4 count of the input signals to the circuit.

Figure 4:
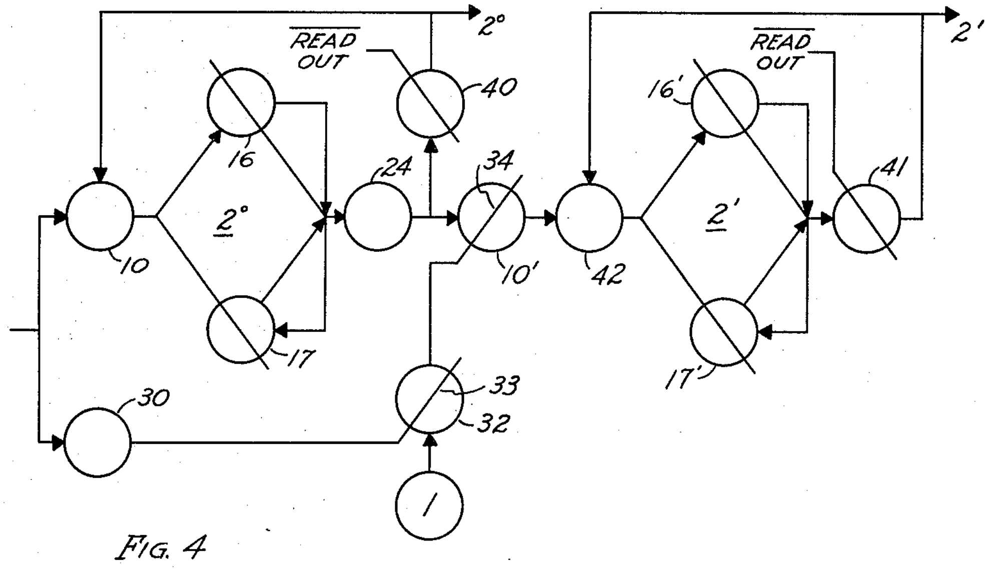
Figure 4 illustrates a modified circuit for Figure 3 where the counter is reset.

Figure 4 illustrates one manner in which the circuit of Figure 3 may be modified so that when a signal is read out from any counter stage, the signal read out will be effective to reset the stage to a zero state. Thus if the $2^0$ stage is in a set state at the time that it is desired to read information out to a utilization circuit, the signal read out from the stage will be fed back to the input of the stage to switch this stage to the reset state.

Considering Figure 4 more specifically, the core circuitry of Figure 3 has been incorporated in Figure 4 using corresponding reference characters. Added to the circuit are a pair of read out gates formed by the core devices 40 and 41. An additional core stage 42 has been added to the input of the $2^1$ stage.

Normally the read out gates formed by the cores 40 and 41 will be closed for the reason that the signal $\overline{\text{READ OUT}}$ will be applying a series of ones to the inhibit windings on the cores 40 and 41, respectively. Upon the occurrence of the read out signal, the inhibit lines on the cores 40 and 41 will be inactive so that if a signal is being stored in either the $2^0$ stage or the $2^1$ stage the signal may be transferred into the gate cores 40 and 41 respectively. Upon the next shift, the signal will be read out to the output line and thence to the utilization circuit. In addition this signal will be fed back to the input of the stage so that the stage will be reset.

For example, if the $2^0$ stage has been set, so that a signal is stored in the circuit, the read out of the stage will result in a signal being written into the core 40. The next shift will read the signal out of the core 40 to the output line and thence back to the input core 10. The next shift on the core 10 will result in the resetting of the $2^0$ stage so that no signal is stored therein. In a similar manner a read-out through core 41 will be fed back to the core 42 and thence reset the stage 21 if that stage was set at the time that the read out signal occurred.

It will be apparent that this circuitry provides a convenient means for clearing the counter whenever a read-out occurs. It will further be apparent that the principles are applicable to a counter having more than two stages.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A binary flip-flop comprising a pair of bistable magnetic core elements, each including a shift winding and a plurality of control windings, means including a single delay line connecting the output of one of said elements to an input on the same element to form a closed loop storage circuit, means including said delay line connecting an output of the other element to said last named input of said one element, an input circuit adapted to supply signals to said flip-flop, means connecting said input circuit to said one element to inhibit the assertion of said one element, means connecting said input circuit to said other element to assert said other element, means including said delay line connecting said one element to inhibit said other element when said one element has been set to function with a signal circulating in said storage circuit and a flip-flop output connected to the output of said delay line.

2. A flip-flop having two stable states adapted to be switched from one stable state to the other and back by the application of successive input pulses comprising a single signal source, a first bistable magnetic core circuit having winding terminals and a shifting circuit, a signal delay circuit, means connecting said winding terminals so that a signal shifted from said core circuit may be read back into said core circuit, a second bistable magnetic core circuit having winding terminals and a shifting circuit, means including said signal delay circuit means connecting said first core circuit to selected winding terminals of said second core circuit to inhibit the reading of any signal into said second core circuit, means including said signal delay circuit means connecting said second core circuit to said first core circuit to read a signal into said first core circuit, means connecting said signal source to read a signal into said second core circuit in the absence of an inhibit signal from said first core circuit, means connecting said signal source to said first core circuit to inhibit the reading of any signal into said first core circuit when there is an input signal, and an output circuit for said flip-flop connected to the output of said delay circuit.

3. In combination, a pair of bistable circuit elements adapted to be set and shifted between two bistable states, a signal delay means connecting the output of one of said bistable circuit elements to the input thereof so that when said one element has been set and shifted, the element output signal feeds back and sets the one circuit element, means including said signal delay means connecting the output of the other of said circuit elements to an input of said one circuit element so that when set and shifted, a set signal will be applied to said one circuit element, a single input circuit, said input circuit being connected to apply a set signal to said other bistable circuit element and an inhibit signal to said one bistable circuit element, means including said signal delay means connecting the output of said one circuit element to an input of said other circuit element to inhibit the setting of said other circuit element when a signal is shifted from said one circuit element, and a circuit output connected to the output of said signal delay means.

4. A data manipulating circuit comprising a pair of bistable storage elements, each having an assertive input winding, an inhibit winding, and an output winding, means connecting said output windings to a common circuit, means connecting the output of said common circuit to an inhibit winding on one of said storage elements and an assertive input winding on the other of said storage elements, a signal input circuit, means connecting said input circuit to the inhibit input winding of the other of said storage elements and to the assertive input winding of said one storage element, and a manipulating circuit output connected to the output of said common circuit.

5. A data manipulating circuit comprising a pair of bistable storage elements, each having an assertive input winding, an inhibit winding, and an output winding, means connecting said output windings to a common signal delay circuit, means connecting the output of said common circuit to an inhibit winding on one of said storage elements and an assertive input winding on the other of said storage elements, a signal input circuit, means connecting said input circuit to the inhibit input winding of the other of said storage elements and to the assertive input winding of said one storage element, and a manipulating circuit output connected to the output of said common signal delay circuit.

6. A magnetic data manipulating circuit comprising a pair of bistable storage elements, each having an assertive input winding, an inhibit winding, and an output winding, means connecting said output windings to a common circuit, means serially connecting the output of said common circuit with an inhibit winding on one of said storage elements and an assertive input winding on the other of said storage elements, a signal input circuit, means serially connecting said input circuit to the inhibit input winding of the other of said storage elements and to the assertive input winding of said one storage element, and a manipulating circuit output connected to the output of said common circuit.

7. A binary counter comprising a plurality of serially connected counter stages, each counter stage comprising a pair of bistable elements, one of which is adapted to be set to dynamically store a signal therein, an input circuit connected to said pair of elements to assert the other of said elements and inhibit said one of said elements, a connection from the output of the other of said elements to an assertive input of said one of said elements and an inhibit input of said other of said elements, and a carry circuit connected to said last named connection, and means connecting the carry connection of each counter stage to the input of the next succeeding stage.

8. A binary counter comprising a plurality of serially connected counter stages, each counter stage comprising a pair of bistable elements, one of which is adapted to be set to dynamically store a signal therein, an input circuit connected to said pair of elements to assert one of said elements and inhibit the other of said elements, a connection from the output of one of said elements to an input of the other of said elements, a carry circuit connected to said last named connection, means connecting the carry connection of each counter stage to the input of the next succeeding stage, a circuit parallel to said counter stage comprising a gating signal source, a signal gate connected to said means connecting the carry connection between stages, and means connecting said input circuit to said gating signal source.

9. A binary counter comprising a plurality of serially connected counter stages, each counter stage comprising a pair of bistable elements, one of which is adapted to be set to dynamically store a signal therein, an input circuit connected to said pair of elements to assert one of said elements and inhibit the other of said elements, a connection from the output of one of said elements to an input of the other of said elements, a carry circuit connected to said last named connection, a gating circuit connected to said carry connection and to the input of the next stage, and circuit means synchronized with the occurrence of an input to the preceding stage connected to said gating circuit for applying a gate opening signal to said gating circuit.

10. A binary counter comprising a plurality of serially connected counter stages, each counter stage comprising a pair of bistable elements, one of which is adapted to be set to dynamically store a signal therein, an input circuit connected to said pair of elements to assert one of said elements and inhibit the other of said elements, a connection from the output of one of said elements to an input of the other of said elements, a carry circuit connected to said last named connection, a gating circuit connected to said carry connection and to the input of the next stage, a signal source connected to said gating circuit to maintain said circuit closed, and means synchronized with the occurrence of an input to the preceding stage for inhibiting the action of said signal source on said gating circuit.

11. A binary counter comprising a plurality of serially connected counter stages, each stage comprising a bistable circuit wherein the bistable circuits are indicative of the stage being set to store a binary zero or a one, a read-out gate connected to each counter stage and adapted to be opened at the time that a read out is to take place from said counter, and means connecting the output of said gate circuit to the input of the associated counter stage to reset said stage in the event that said stage had been set at the time that the read-out took place.

12. A binary counter comprising a plurality of serially connected counter stages, each stage comprising a bistable magnetic core circuit wherein the setting of the bistable cores are indicative of the stage being set or reset, a magnetic core read-out gate connected to each counter stage and adapted to be opened at the time that a read-out is to take place from said counter, and means connecting the output of said gate circuit to the input of the associated counter stage to reset said stage in the event that said stage had been set at the time that the read-out took place.

References Cited in the file of this patent

UNITED STATES PATENTS 2,778,006 Guterman ______________ Jan. 15, 1957

OTHER REFERENCES

"Proceedings of the I.R.E.," March 1955, pages 291 to 298.